United States Patent [19]
Waldschmidt

[11] Patent Number: 5,222,373
[45] Date of Patent: Jun. 29, 1993

[54] TRANSPORT REFRIGERATION CONDENSER UNIT SUITABLE FOR HORIZONTAL AND VERTICAL MOUNTING

[75] Inventor: William L. Waldschmidt, Farmington

[73] Assignee: Thermo King Corporation, Minneapolis, Minn.

[21] Appl. No.: 945,790

[22] Filed: Sep. 16, 1992

[51] Int. Cl.⁵ .............................................. B60H 1/32
[52] U.S. Cl. ........................................ 62/239; 62/298; 62/509
[58] Field of Search .......................... 62/239, 298, 509

[56] References Cited

U.S. PATENT DOCUMENTS

| | | | |
|---|---|---|---|
| 3,415,073 | 12/1968 | Ammons | 62/259 |
| 3,712,078 | 1/1973 | Maynard et al. | 62/298 X |
| 4,047,776 | 9/1977 | Krick et al. | 312/245 |
| 4,048,910 | 9/1977 | Weir | 98/216 |
| 4,458,502 | 7/1984 | Adachi et al. | 62/259.1 |
| 4,468,060 | 8/1984 | FitzGerald et al. | 62/239 X |
| 4,549,405 | 10/1985 | Anderson et al. | 62/239 |
| 4,660,389 | 4/1987 | Kido et al. | 62/298 |
| 4,679,617 | 7/1987 | Keldman | 165/56 |
| 4,995,243 | 2/1991 | Ward | 62/298 |
| 5,001,908 | 3/1991 | Mayer | 62/470 |
| 5,046,327 | 9/1991 | Walker et al. | 62/244 |

OTHER PUBLICATIONS

ThermoKing Bulletin #TK30063 published Mar. 1990.

Primary Examiner—William E. Tapolcai
Attorney, Agent, or Firm—M. J. Moran

[57] ABSTRACT

A transport refrigeration system having separate evaporator and condenser units, with the condenser unit being mountable in either a vertical or a horizontal orientation. The condenser unit includes a frame supporting a condenser coil, a compressor and a refrigerant receiver. The compressor is a dry sump compressor having a predetermined centerline, with the compressor being operable with said predetermined centerline in any orientation within 45° of a vertical centerline through the compressor. The compressor is oriented on the frame such that when the frame is oriented for vertical mounting the predetermined centerline of the compressor defines a first angle of about 45° with the vertical centerline, and when the frame is oriented for horizontal mounting the predetermined centerline of the compressor defines a second angle of about 45° with the vertical centerline, with the first and second angles being on opposite sides of the vertical centerline.

14 Claims, 6 Drawing Sheets

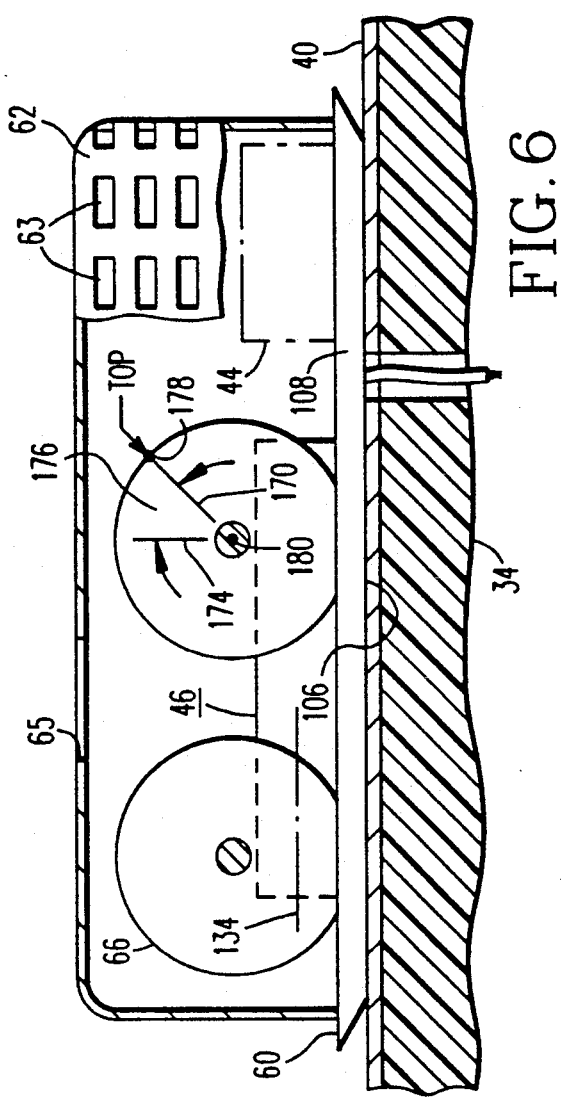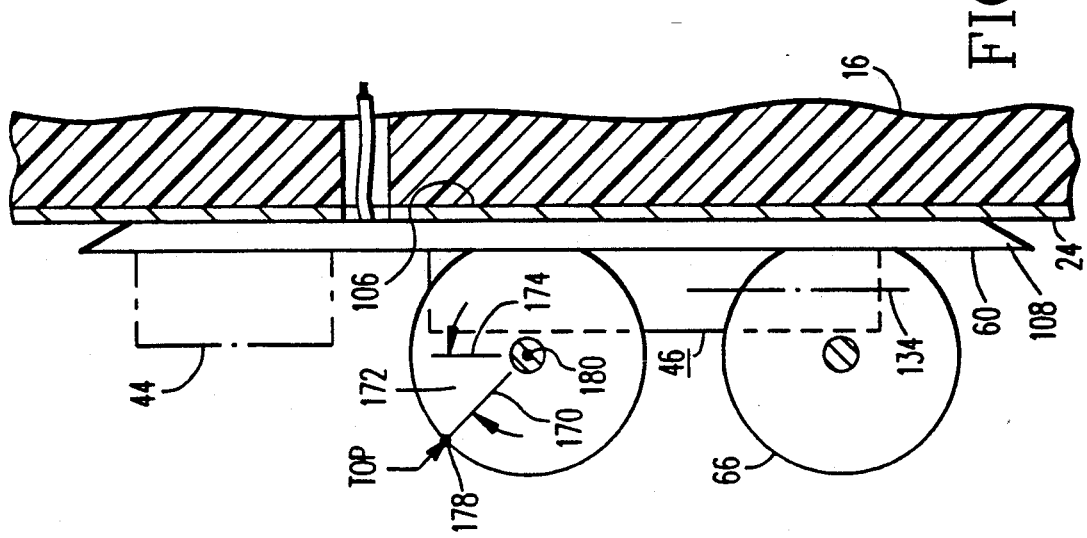

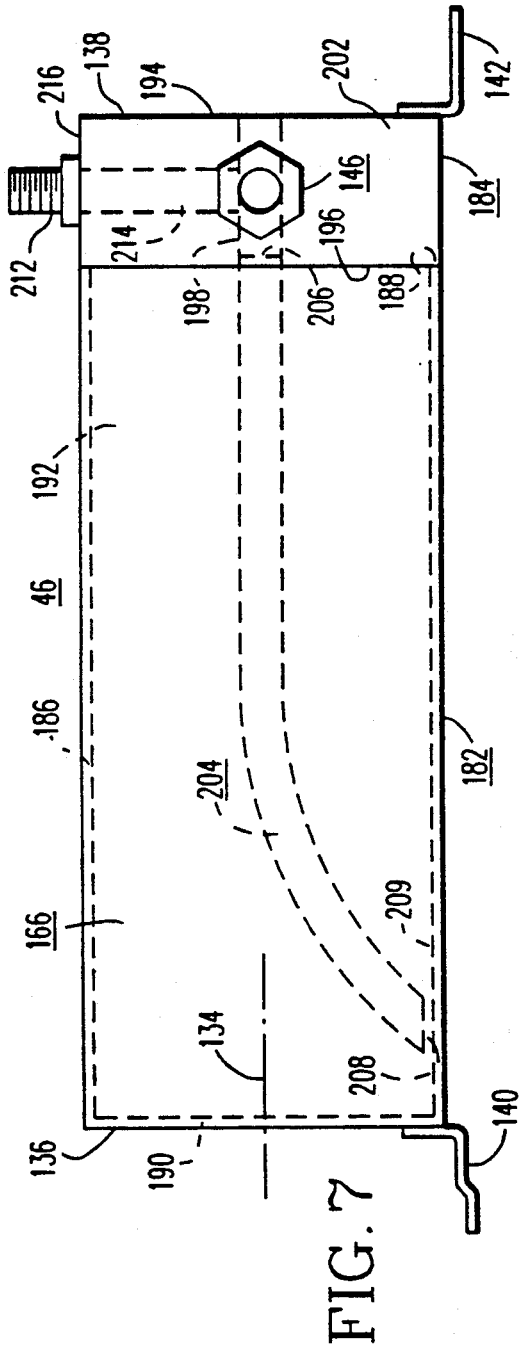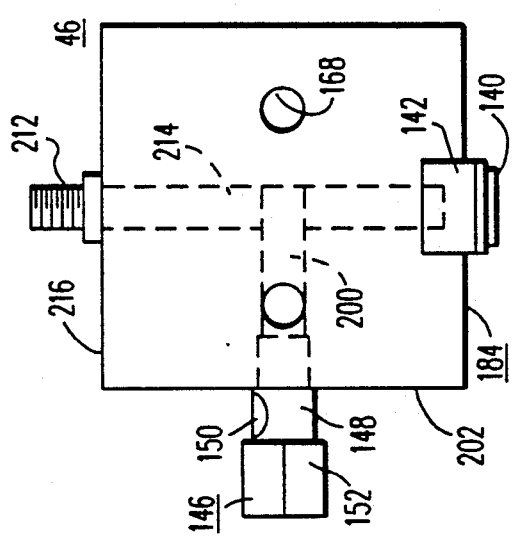

5,222,373

TRANSPORT REFRIGERATION CONDENSER UNIT SUITABLE FOR HORIZONTAL AND VERTICAL MOUNTING

TECHNICAL FIELD

The invention relates in general to refrigeration systems, and more specifically to transport refrigeration systems suitable for controlling the temperature of a conditioned space of a vehicle, such as straight trucks and delivery vans.

BACKGROUND ART

Transport refrigeration systems for straight trucks and vans commonly utilize separate condenser and evaporator sections or units, with a condenser unit being vertically mounted on the nose or front wall of a straight truck, or on a roof of a van, and with an evaporator unit being mounted in a conditioned space of the associated vehicle. Different condenser units are manufactured and stocked for vertical wall mounting and horizontal roof mounting, as the sump of conventional refrigeration compressors requires a vertical orientation. Further, refrigeration receiver tanks conventionally require a predetermined orientation. Also, the condenser coil must not be mounted for upward flow, as hot vapors will blow past condensing liquid and appear, undesirably, at the output of the condenser.

It would be desirable, and it is an object of the invention. to provide a condenser unit which may be selectively mounted in either of two orientations. vertically, for mounting on a wall of a vehicle, and horizontally, for mounting on the roof of a vehicle.

SUMMARY OF THE INVENTION

The invention is a transport refrigeration system having separate evaporator and condenser units, with the condenser unit having a frame supporting predetermined components which include a condenser coil, a compressor and a refrigerant receiver. The compressor is a dry sump compressor having a predetermined centerline disposed perpendicular to the rotational axis, with the compressor being operable with the predetermined center-line in any orientation within 45° of a vertical center-line through the compressor. The dry sump compressor is oriented on the frame such that when the frame is oriented for vertical mounting the predetermined centerline of the compressor defines a first angle of 45° with the vertical centerline. When the frame is oriented for horizontal mounting the predetermined centerline of the compressor defines a second angle of 45° with the vertical center-line, with the first and second angles being on opposite sides of the vertical centerline. The condenser unit is thus operable with the frame in vertical and horizontal orientations for wall and roof mounting, respectively, of the condenser unit on an associated vehicle.

In a preferred embodiment of the invention, the refrigerant receiver includes a housing defining a closed space, inlet and outlet openings to the closed space, and a pick-up tube. The pick-up tube has an inlet end disposed in the closed space, an outlet end in communication with the outlet opening in the housing, and a configuration which places the inlet end of said pick-up tube at substantially the lowest point of the enclosed space when the frame is oriented for vertical mounting and when the frame is oriented for horizontal mounting.

BRIEF DESCRIPTION OF THE DRAWINGS

The invention will become more apparent by reading the following detailed description in conjunction with the drawings, which are shown by way of example only, wherein:

FIG. 5 is a side elevational view of the condenser unit of FIG. 4 mounted vertically on a wall of a vehicle, illustrating a dry sump compressor mounted in an allowable 45° from vertical orientation;

FIG. 6 is a side elevational view of the condenser unit of FIG. 4 mounted horizontally on a roof of a vehicle, illustrating that when the condenser unit is pivoted 90° from the vertical orientation of FIG. 5 to the horizontal orientation of FIG. 6 that the dry sump compressor is rotated to an allowable 45° from vertical orientation, on the other side of a vertical centerline through the compressor from the FIG. 5 orientation;

FIG. 7 is a side elevational view of a receiver tank construction used in the condenser unit of the invention, with the receiver tank being operable in the horizontal orientation illustrated, and also when the receiver tank is pivoted 90° counterclockwise about the left-hand end thereof to a vertical orientation;

FIG. 8 is an end elevational view of the receiver tank shown in FIG. 7; and

DESCRIPTION OF PREFERRED EMBODIMENTS

Figure 1:
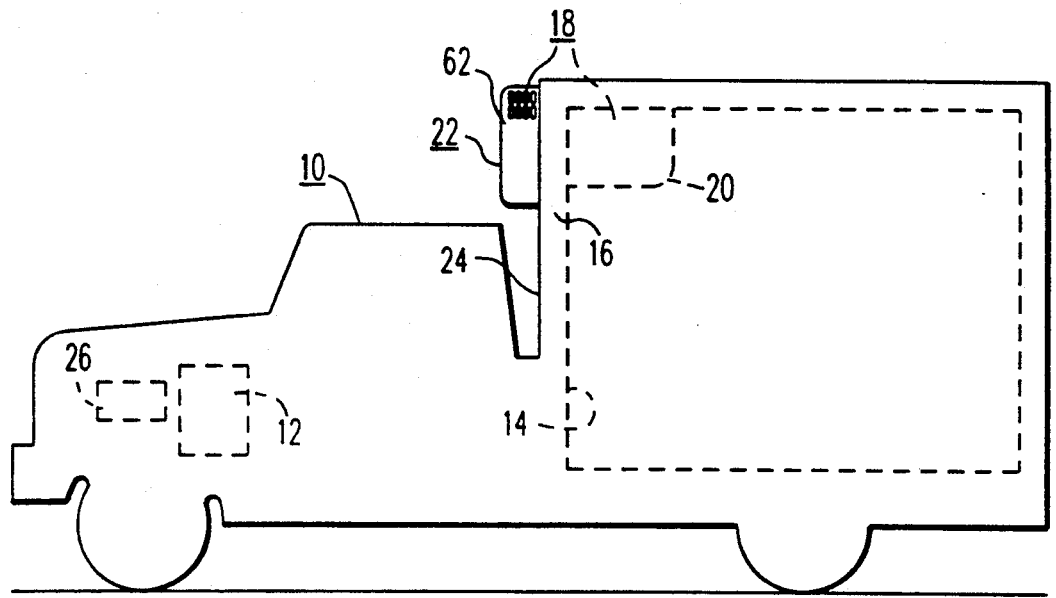
FIG. 1 is an elevational view of a straight truck illustrating a condenser unit constructed according to the invention vertically mounted on the front wall or nose thereof.

Referring now to the drawings, and to FIG. 1 in particular there is shown an elevational view of a straight truck 10 having an engine 12 and a conditioned cargo space 14 which is defined by a plurality of insulative wall members, including a forward wall member 16. Conditioned space 14 is temperature controlled via a transport refrigeration system 18. Transport refrigeration system 18 includes an evaporator unit 20 disposed in the conditioned space 14, a condenser unit 22 mounted on a vertically oriented outside surface 24 of wall member 16, and a refrigerant compressor 26 driven by truck engine 12.

Figure 2:
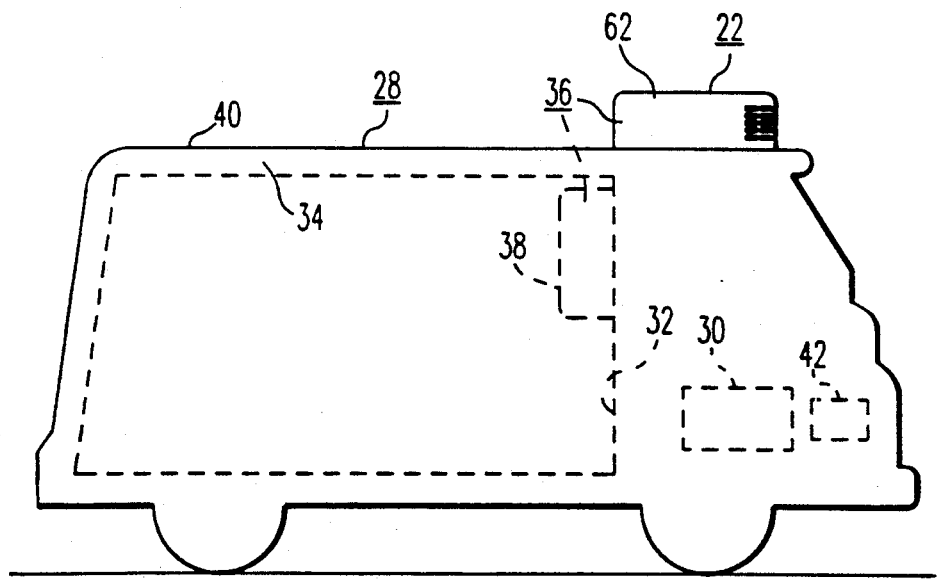
FIG. 2 is an elevational view of a van illustrating the condenser unit of FIG. 1 horizontally mounted on the roof thereof.

FIG. 2 illustrates an elevational view of a delivery van 28 having an engine 30 and a conditioned cargo space 32 which is defined by a plurality of insulative wall members, including a roof member 34. Conditioned space 32 is temperature controlled via a transport refrigeration system 36. Transport refrigeration system 36 includes an evaporator unit 38 disposed in the conditioned space 32, a condenser unit 22 mounted on a horizontally oriented outside surface 40 of roof member 34, and a refrigerant compressor 42 driven by engine 30.

The condenser units of both transport refrigeration systems 18 and 36 are identified with the same reference number 22 as, according to the teachings of the invention, they are of like construction, notwithstanding that in the truck application of FIG. 1 the condenser unit 22 is mounted on a vertically oriented surface 24, and in the van application of FIG. 2 the condenser unit 22 is mounted on a horizontally oriented surface 40.

Figure 3:
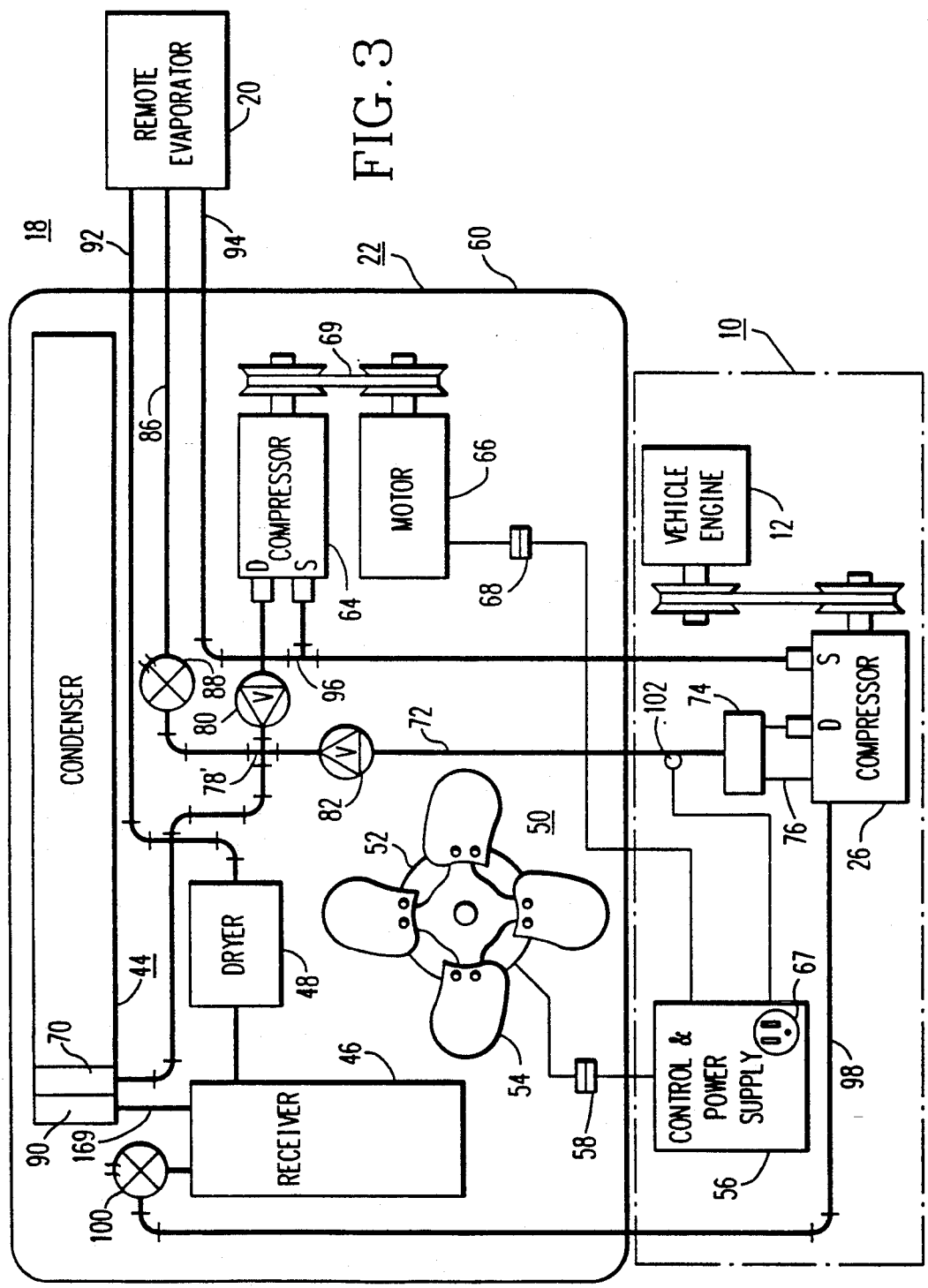
FIG. 3 diagrammatically illustrates a transport refrigeration system having a condenser unit constructed according to the teachings of the invention.

FIG. 3 is a diagrammatic representation of transport refrigeration system 18 shown in FIG. 1, with transport refrigeration system 36 of FIG. 2 being of like construction. Condenser unit 22 includes a condenser coil 44, a refrigerant receiver 46, a refrigerant dryer 48, and air mover means 50. Air mover means 50 includes an electric motor 52, preferably a DC motor, and a fan 54. Electric motor 52 is connected to a power supply associated with electrical control 56 via a connector 58, with electrical control being mounted in a box or housing located in an easy-to-reach location. In the truck application of FIG. 1, co-operable elements of connector 58 are oriented to cause motor 52 to rotate in a first rotational direction which causes fan 54 to draw ambient air into condenser unit 22. Ambient air drawn into condenser unit 22 is directed through the condenser coil 44 via an enclosure which includes a mounting and support frame 60 and a removable cover 62, with the cover 62 being shown in FIGS. 1, 2 and 6. The resulting heated air, which includes heat rejected by condenser coil 44, is exhausted to ambient air via condenser air openings 63 in cover 62 which surround condenser coil 44. Ambient air is drawn into condenser unit 22 via an opening 65 in cover 62 disposed immediately adjacent to fan 54.

In the van application of FIG. 2 the elements of connector 58 are reversed to cause motor 52 to rotate in a second or opposite rotational direction which causes fan 54 to draw heated air from condenser coil 44 and exhaust the heated air to ambient air. Ambient air is thus drawn into condenser coil 44 through condenser air openings 63 in cover 62, and it is directed via frame 60 and cover 62 to the fan 54 where it is exhausted to the ambient air via the opening 65 in cover 62 adjacent to fan 54.

Condenser unit 22 of transport refrigeration system 18 may also include a refrigerant compressor 64 driven by a stand-by prime mover, e.g., an electric motor 66, with motor 66 including a connector 68 for connection to electrical control 56. Electrical control 56 includes an electrical power receptacle 67 for power hook-up on electrical standby operation when truck 10 is parked with its engine 12 off. Motor 66 and compressor 64 are operably linked, such as via a pulley-belt arrangement 69.

A discharge port D of the engine driven main or primary compressor 26 is connected to an input header 70 of condenser coil 44 via a hot gas line 72. A refrigerant/oil separator 74 may be disposed in hot gas line 72 for removing atomized particles of compressor oil from the hot refrigerant discharge vapor, which particles are returned to compressor 26 via an oil return line 76. Stand-by compressor 64 is connected to hot gas line 72 at a connector 78 via a check valve 80, with hot gas line 72 also containing a check valve 82 between tee 78 and compressor 26. Hot gas line 72 may additionally be tapped at connector 78 for connecting a hot gas line 86 to the remote evaporator unit 20, with hot gas line 86 including a controllable valve 88. Electrical control 56 opens valve 88 when it is desired to defrost an evaporator coil associated with evaporator unit 20.

Refrigerant condensed in condenser coil 44 flows from an output header 90 to the refrigerant receiver 46. Liquid refrigerant from receiver 92 flows to the remote evaporator unit 20 via a liquid line 92 which includes the refrigerant dryer 48. Evaporated refrigerant from remote evaporator unit 20 returns to a suction port S of compressor 26 via a suction line 94. A suction port S of standby compressor 64 is connected to suction line 94 via a tee 96.

Injection cooling of compressor 26 is provided by a conduit 98 and controllable valve 100. Conduit 98 taps the liquid line, such as within receiver 46, as will be hereinafter explained, and extends to a metering port on compressor 26. A temperature sensor 102 on the hot gas line 72 signals electrical control 56 when to open valve 100 and inject a metered amount of liquid refrigerant into compressor 26. The liquid refrigerant vaporizes and reduces the operating temperature of the compressor 26, extending compressor operating life.

Figure 4:
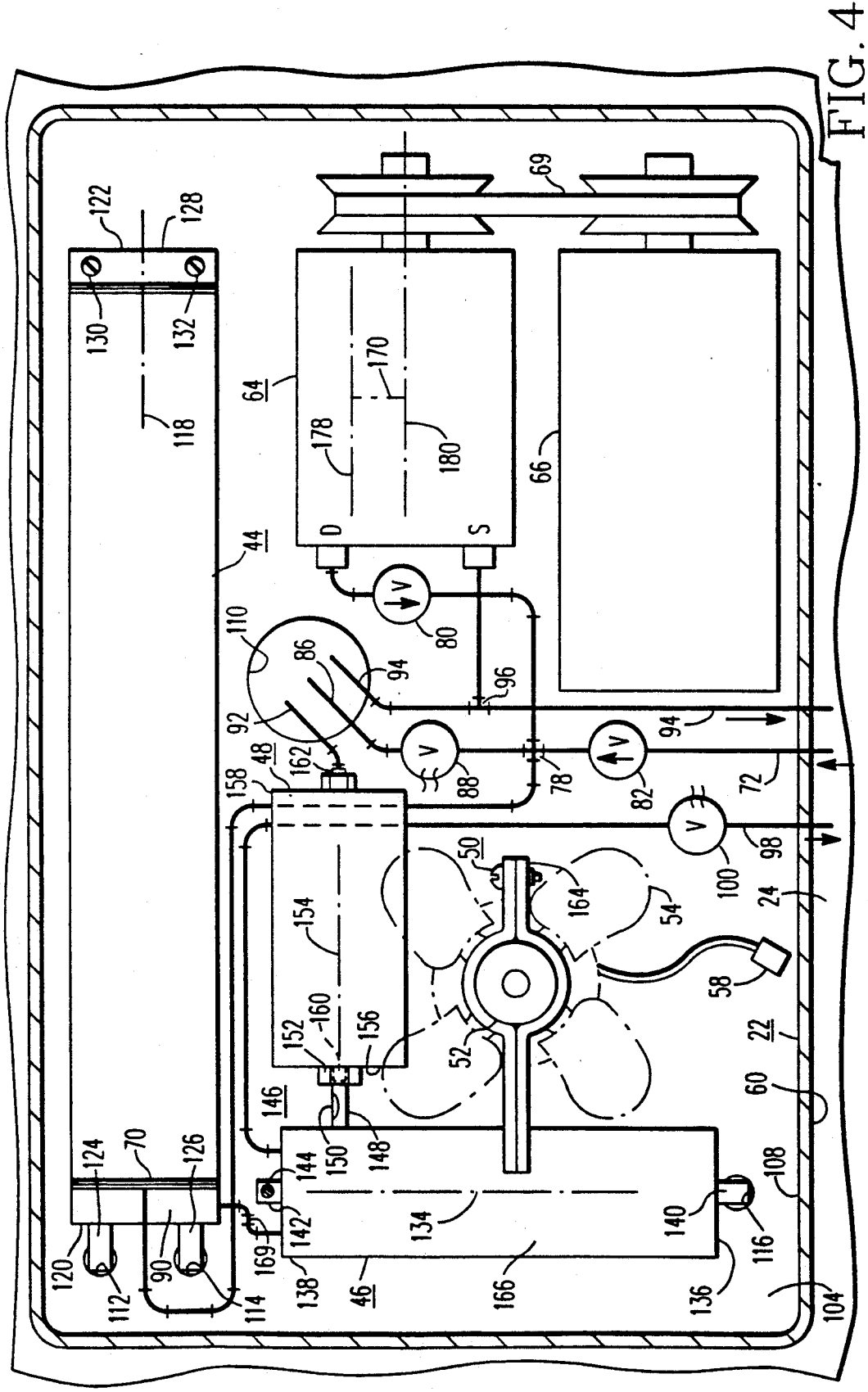
FIG. 4 is an enlarged, more detailed view of the condenser unit shown in FIG. 3, with FIG. 4 being a front elevational view of the condenser unit when the condenser unit is mounted vertically on a wall of a vehicle, and with FIG. 4 being a plan view of the condenser unit when the condenser unit is mounted horizontally on a roof of a vehicle.

FIG. 4 is a more detailed illustration of condenser section or unit 22, with FIG. 4 being an elevational view of condenser unit 22 in FIG. 1, and a top plan view of condenser unit 22 in FIG. 2. Frame 60 is a substantially flat metallic sheet member constructed of a suitable material such as steel or aluminum, having first and second major opposed surfaces 104 and 106, with the second surface being illustrated in FIGS. 5 and 6. The major flat opposed surfaces 104 and 106 terminate in a perimetrical flange 108 which extends outwardly in the direction of surface 104. As best illustrated in FIGS. 5 and 6, flange 108 may make an obtuse angle with surface 104, such as an angle of about 105 degrees, so that a plurality of frames 60 may be stacked together during manufacturing and shipping processes. Frame 60 defines a plurality of openings, including an opening 110 through which conduits 86, 92, and 94 pass for connection to the remote evaporator unit 20, and openings 112, 114 and 116 which aid the mounting of components and reduce the number of fasteners required.

More specifically, assembly time and thus manufacturing cost is reduced by constructing certain of the components with mounting legs in the form of locking tabs which cooperate with the mounting openings in frame 60. The condenser coil 44, which is an elongated structure having a longitudinal axis 118 extending between first and second longitudinal ends 120 and 122, has first and second locking tabs 124 and 126 at the first longitudinal end 120, and a mounting bracket 128 at the second longitudinal end 122. Condenser coil 44 is quickly mounted on frame 60 by placing condenser coil 44 at an angle relative to frame surface 104 while respectively advancing locking tabs 124 and 126 into openings 112 and 114. Condenser coil 44 is then pivoted towards frame surface 104, about the locking tabs, and when the mounting bracket 128 rests against frame surface 104, mounting flange 128 is secured to frame surface 104 via two fasteners or screws 130 and 132.

In like manner, the refrigerant receiver 46, which is an elongated structure having a longitudinal axis 134 extending between first and second longitudinal ends 136 and 138, has a locking tab 140 fixed at the first longitudinal end 136, and a mounting bracket 142 fixed to the second longitudinal end 138. Receiver 46 is mounted by advancing locking tab 140 into mounting opening 116 in frame 60, pivoting receiver 46 about locking tab 140 until mounting bracket 142 rests against frame surface 104, and then mounting bracket 142 is secured to frame surface 104 with a fastener or screw 144.

As will be hereinafter explained in detail, refrigerant receiver 46 includes an output conduit assembly 146 which includes a conduit 148 having a sight glass 150 and an O-ring seal (ORS) fitting 152. Dryer 48, which is an elongated structure having a longitudinal axis 154 extending between first and second longitudinal ends 156 and 158, has a threaded stud-like fitting 160 at its first longitudinal end 156 which is threadably engaged with ORS fitting 152. Thus, the need for refrigerant tubing, and associated brazed joints, is eliminated between receiver 46 and dryer 48, and the need for a separate support bracket between the first axial end 156 of dryer 48 and frame 60 is also eliminated. The second longitudinal end 158, which is connected to liquid line conduit 92, includes a mounting bracket 162 which is fixed to frame surface 104 with a single fastener or screw (not shown).

Motor 52 of air mover means 50 may be fastened directly to frame surface 104 via conventional a spider-like mounting bracket, or, as illustrated, motor 52 may be supported by a mounting bracket assembly 164 which is formed integrally with an outer housing portion 166 of refrigerant receiver 46.

Thus, in a preferred embodiment of the invention, condenser coil 44, refrigerant receiver 46, dryer 48 and air mover means 50 are mounted to frame surface 104 with only three locking tabs and four fasteners or screws.

Liquid line tubing between receiver 46 and dryer 48 is eliminated by threadably connecting dryer 48 directly to the ORS fitting 152 on receiver 46. Also in this preferred embodiment of the invention, a separate piece of liquid line tubing between the output header 90 of condenser coil 44 is eliminated by providing an input opening 168 on receiver 46 which is dimensioned to receive refrigerant tubing 169 which provided as part of the output header 90 of condenser coil 44. Thus, tubing 169 may be inserted into opening 168 of receiver 46 and thereafter soldered or brazed.

Standby refrigerant compressor 64 is a dry sump compressor used by the automotive industry and manufactured by such companies as Sanden and Diesel Kiki. Compressor 64 is called a "dry sump" compressor because the oil sump of the compressor only contains about three to four ounces of lubricating oil, as opposed to fourteen to twenty ounces in a conventional refrigerant compressor of comparable rating. A conventional compressor must be operated such that a predetermined centerline thereof is substantially vertically oriented, because of the oil sump. A dry sump compressor may be operated with a predetermined axis or centerline in any orientation within 45° of a vertical centerline through the compressor. This allows considerable leeway for automotive manufacturers to locate dry sump compressors within cramped engine compartments.

Referring to FIGS. 4, 5 and 6, dry sump compressor 64 is mounted on surface 104 of frame 60 such that when frame 60 is oriented for vertical mounting of condenser unit 22, as illustrated in FIG. 5, a predetermined centerline 170 of compressor 64 defines a first angle 172 of 45° with a vertical centerline 174. When frame 60 is oriented for horizontal mounting of condenser unit 22, as illustrated in FIG. 6, the predetermined centerline 170 of compressor 64 defines a second angle 176 of 45° with the vertical centerline 174, with the first and second angles 172 and 176 being on opposite sides of the vertical centerline 174. Broken line 178 in FIG. 4 represents the top of compressor 64, and broken line 180 is the longitudinal or rotational axis of compressor 64, with centerline 170 extending between broken line 178 and rotational axis 180. Thus, standby compressor 64 is operable with frame 60 in vertical and horizontal orientations for wall and roof mounting, respectively, of condenser unit 44 on an associated vehicle 10 or 28.

Figure 9:
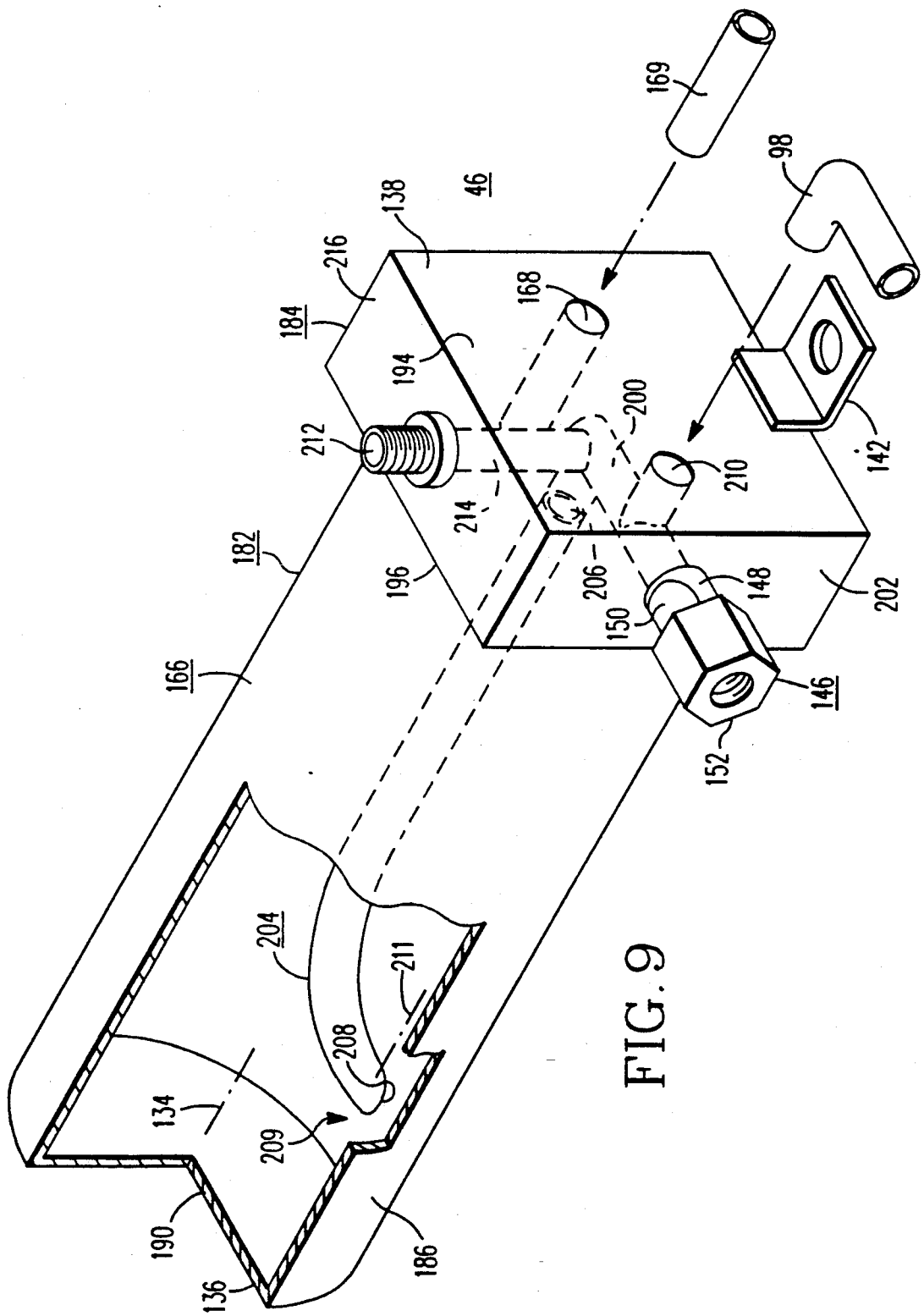
FIG. 9 is a fragmentary perspective view of the receiver tank shown in FIGS. 7 and 8.

Refrigerant receiver 46 is constructed to operate properly when its longitudinal axis 134 is vertically oriented, as shown in FIG. 5, and also when its longitudinal axis 134 is horizontally oriented, as shown in FIG. 6. A suitable construction for refrigerant receiver 46 is shown in FIGS. 7, 8 and 9, with FIG. 7 being a side elevational view, FIG. 8 being an elevational view of the second longitudinal end 138, and FIG. 9 being a fragmentary perspective view, illustrating the second longitudinal end 138 of receiver 46.

Outer housing 166 of receiver 46 includes a tubular member 182 and a component mounting block member 184. Tubular member 182 includes a cylindrical outer side wall portion 186 having a first longitudinal end which coincides with the first longitudinal end 136 of receiver 46, and a second longitudinal end 188. The first end is closed by an end wall portion 190 and the second end 188 is closed by block member 184. Thus, housing 166 defines a closed space 192 for receiving refrigerant in a liquid state from condenser coil 44.

Component mounting block member 184 includes an outer surface 194 which coincides with the second longitudinal end 138, and an opposite surface 196 which closes the second end 188 of tubular member 182. Refrigerant inlet opening 168, which receives condenser header output tube 169, extends between surfaces 194 and 196. An outlet for refrigerant flow from receiver 46 to the liquid line 92, via output conduit assembly 146 and dryer 48, is provided by an opening 198 which extends inwardly from end surface 196 of mounting block 184, and by an opening 200 which extends inwardly from a side or lateral surface 202 of mounting block 184, with openings 198 and 200 intersecting one another within mounting block member 184. Opening 200 receives conduit member 148 of output conduit assembly 146.

A metallic pick-up tube 204 is provided within enclosed space 192 which has first and second ends 206 and 208, and a predetermined curved configuration. The first or outlet end 206 is fixed within opening 198 of mounting block 184, with pick-up tube 204 being oriented such that the curved configuration thereof places the second or inlet end 208 at substantially the lowest point of enclosed space 192, in both the vertical and horizontal orientations of its longitudinal axis 134 illustrated in FIGS. 5 and 6. In other words, the inlet end 208 is located close to end wall 190, with end wall 190 being the lowest point of enclosed space 192 when longitudinal axis 134 of receiver 46 is vertically oriented. The inlet end 208 is also located close to a portion 209 of side wall 186, with portion 209 being that portion which is closest to surface 104 of frame 60, as the portion of side wall 186 which is closest to surface 104 of frame 60 is the lowest portion of enclosed space 192 when longitudinal axis 134 if receiver 46 is horizontally oriented. An imaginary line 211 drawn along side wall 186 between locking tab 140 and mounting bracket 142 defines the portion 209 of side wall 186 to which the inlet end 208 of pick-up tube 204 is closely adjacent.

Liquid refrigerant for the hereinbefore described compressor cooling arrangement for cooling compressor 26 is provided by an opening 210 which extends inwardly from end surface 194 of mounting block 184, with opening 210 intersecting opening 200. Refrigerant conduit or tubing 98 is fixed within opening 210. A fitting 212 for receiving a pressure relief valve (not shown) is fixed in an opening 214 which extends inwardly from a lateral surface 216 such that opening 214 intersects opening 198.

In summary, there has been disclosed a new and improved condenser section or unit 22 for transport refrigeration systems 18 or 36 which may be efficiently operated when a supporting frame 60 is mounted on a vertically oriented surface 24 of a wall member 16, and also when the supporting frame 60 is mounted on a horizontal oriented surface 40 of a roof member 34. The frame 60 is formed of a substantially flat sheet metal member, with all components being mounted closely adjacent to a support surface 104 thereof, reducing cantilever loading when in a vertical orientation, and taking advantage of structural support provided by wall member 16 in a vertical orientation, and roof member 34 in a horizontal orientation. In a preferred embodiment of the invention, condenser unit 22 is constructed to mount a condenser coil 44, a refrigerant receiver 46, a refrigerant dryer 48, and air mover means 50, to a frame 60, with only three locking tabs 124, 126, 140 and only four fasteners, such as screws. Liquid line tubing between the condenser coil 44 and receiver is eliminated by connecting an output header tube 169 directly to a receiver inlet opening 168, and liquid line tubing between dryer 48 and receiver 46 is eliminated by threadably engaging a threaded inlet stud 160 of dryer 48 into an ORS fitting 152 provided on receiver 46.

I claim:

1. A transport refrigeration system having separate evaporator and condenser units, with the condenser unit having a frame supporting predetermined components including a condenser coil, a compressor and a refrigerant receiver, the improvement comprising:

said compressor being a dry sump compressor having a predetermined centerline, with said compressor being operable with said predetermined centerline in any orientation within 45° of a vertical centerline through the compressor, said dry sump compressor being oriented on the frame such that when the frame is oriented for vertical mounting the predetermined centerline of the compressor defines a first angle of about 45° with said vertical centerline, and when the frame is oriented for horizontal mounting the predetermined centerline of the compressor defines a second angle of about 45° with said vertical centerline, with said first and second angles being on opposite sides of said vertical centerline, whereby said compressor is operable with the frame in vertical and horizontal orientations for wall and roof mounting, respectively, of the condenser unit on an associated vehicle.

2. The transport refrigeration system of claim 1 wherein the refrigerant receiver includes a housing defining a closed space, inlet and outlet openings to said closed space, and pick-up tube means, said pick-up tube means having an inlet end disposed in said closed space, an outlet end in communication with said outlet opening in the housing, and a configuration which places the inlet end of said pick-up tube means at substantially the lowest point of the enclosed space when the frame is oriented for vertical mounting and when the frame is oriented for horizontal mounting.

3. The transport refrigeration system of claim 2 wherein the housing of the refrigerant receiver has first and second axial ends, and a side wall portion extending between said first and second ends, and wherein:

the inlet and outlet openings of the housing are disposed adjacent to said first axial end, the housing is mounted on the frame with a predetermined portion of said side wall of the housing closely adjacent to the frame, and the inlet end of the pick-up tube means is disposed closely adjacent to said second axial end of the housing and closely adjacent to said predetermined portion of the side wall which is closely adjacent to the frame.

4. The transport refrigeration system of claim 1 wherein the condenser coil has first and second axial ends, the frame defines openings therein, and including mounting means for the condenser coil comprising at least one predetermined opening in the frame, locking tab means at the first axial end of the condenser coil which enters said at least one predetermined opening, mounting bracket means at the second axial end of the condenser coil, and fastener means fixing said mounting bracket means to said frame.

5. The transport refrigeration system of claim 1 wherein the receiver has first and second axial ends, the frame defines openings therein, and including mounting means for the receiver tank comprising a predetermined opening in the frame, locking tab means at the first axial end which enters said predetermined opening, mounting bracket means at the second axial end, and fastener means fixing said mounting bracket means to said frame.

6. The transport refrigeration system of claim 1 wherein the frame comprises a substantially flat metallic sheet member having inner and outer major sides and upturned perimetrical edges extending toward said inner major side, with said inner major side supporting the predetermined components of the condenser unit, and with said outer major side being adapted for mounting against, and support by, a selected vehicle surface which is oriented either vertically or horizontally.

7. The transport refrigeration system of claim 1 including air mover means on the frame having selectable first and second rotational directions respectively associated with vertical and horizontal mounting orientations of the frame.

8. The transport refrigeration system of claim 7 wherein the first rotational direction of the air mover means draws ambient air into the condenser unit, and the second rotational direction of the air mover means discharges air heated by the condenser coil out of the condenser unit.

9. The transport refrigeration system of claim 7 wherein the air mover means includes a DC motor, a fan, and a DC power supply, and means connecting the DC power supply to the DC motor with a selectable polarity to select the desired rotational direction of the DC motor.

10. The transport refrigeration system of claim 1 wherein the condenser coil includes an output tube and the refrigerant receiver includes an input opening dimensioned to receive said output tube, and wherein the output tube of the condenser coil is fixed within the input opening of the refrigerant receiver.

11. The transport refrigeration system of claim 1 including a refrigerant dryer having first and second axial ends, and wherein the first axial end of the dryer and the refrigerant receiver include cooperative fastening means, with the cooperative fastening means including complementary threaded elements, whereby the refrigerant dryer is directly threadably engaged with the refrigerant receiver to eliminate intermediate conduits between the refrigerant receiver and dryer and provide mounting support for the first axial end of the dryer.

12. The transport refrigeration system of claim 11 including means fastening the second axial end of the refrigerant dryer to the frame.

13. The transport refrigeration system of claim 1 including a prime mover mounted on the frame operably linked to the refrigerant compressor.

14. The transport refrigeration system of claim 1 including air mover means comprising an electric motor and a fan, and wherein the refrigerant receiver includes a housing having means for mounting said electric motor.

* * * * *